April 11, 1961
M. O. SCHUR
2,979,058
MANUFACTURE OF LAMINATED FILTER TIP
Filed Jan. 15, 1957
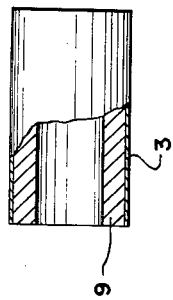
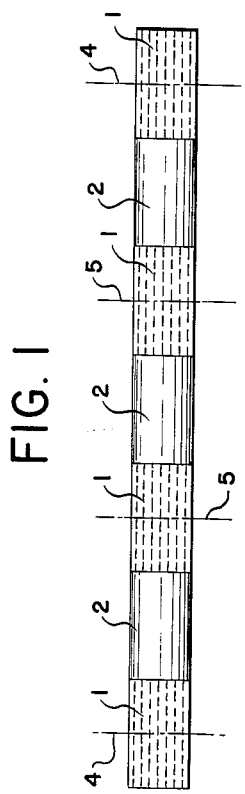
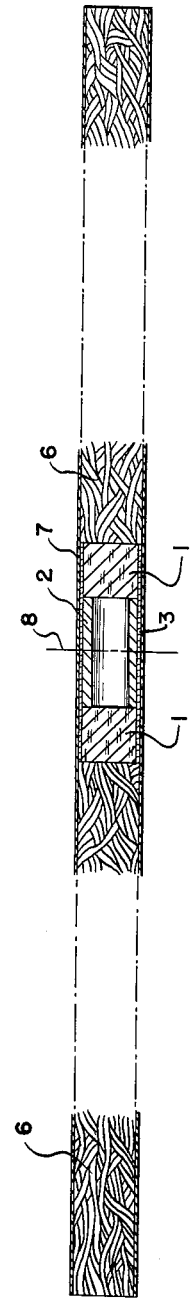
INVENTOR
Milton O. Schur
BY
Penne, Edmonds, Morton, Barrows & Taylor
ATTORNEYS 2,979,058

MANUFACTURE OF LAMINATED FILTER TIP

Milton O. Schur, Asheville, N.C., assignor to Olin Mathieson Chemical Corporation, New Haven, Conn., a corporation of Virginia Filed Jan. 15, 1957, Ser. No. 634,341

1 Claim. (Cl. 131—10)

This invention relates to composite filter tips and is a continuation in part of my copending application, Serial No. 578,989, filed April 18, 1956.

In said application I have disclosed and claimed a method of and apparatus for making laminated filter tips, that is, a tip in which the inner portion adjacent the end of the cigarette is of a different construction or composition from the outer portion which is placed in the smoker's mouth. The application also discloses a filter in which the outer section is formed of a paper tube or cylinder of sufficient strength to withstand handling or cutting.

Such laminated filter rods of multiple sections of filter tips may advantageously be used in the manufacture of recessed filter tips, that is, a filter tip in which the filtering material is contained in the inner portion of the filter tip, and the outer portion is a hollow tube.

A laminated tip of this type may be formed by alternately arranging the sections and wrapping them in paper. It has been proposed to produce recessed filter tips by employing a wrapper of stiff paper or cardboard, spacing filter plugs at intervals longitudinally of the paper or cardboard and then rolling the assembly into a tube. In such construction the paper or cardboard must be stiff enough to resist excessive deformation during the smoking of the cigarette. Paper of the required stiffness is difficult to handle in machines in which it must be formed into a tube and then assembled as part of a cigarette.

I have found that a much more satisfactory practice is to provide a hollow tube to form the alternate section of the filter tip, or the recessed end, and to align these tube sections alternately with filter tip sections to form filter rods which may eventually be cut to filter tip or double filter tip length. As stated in my earlier application, the tube may be a paper tube or cylinder which possesses sufficient strength to withstand handling by the smoker, and permit it to be cut in the various types of machines and equipment employed in the manufacture of cigarettes. Thus, many materials other than paper might be used. A heavy cellulose base material in the form of a spiral wound tube, such as the conventional sipping straw, has been found to be highly satisfactory.

Cellulose acetate tubing or polyethylene tubing formed by conventional extrusion methods may be used. A metal that is light and which is soft enough to be cut at high speed on a cigarette-making machine may be employed. Thus, a metal foil, such as aluminum foil, may be wrapped of several layers thickness to form a suitable tube section. The foil may be sprayed with a suitable bonding agent as it is wrapped. Metals, other than aluminum, might be used, and the tube might be formed in other ways, as by extrusion, by spiral winding, or by forming a tube with a crimped seam.

In the accompanying drawings I have illustrated the invention in filter rod form and as a filter tip forming a part of a cigarette. In this showing:

Fig. 1 is a sectional view of a filter rod, formed of a plurality of filter sections;

Fig. 2 is an enlarged view of the outer end of a filter tip, parts being shown in section; and Fig. 3 is a sectional view illustrating the assembly of a double filter tip with two cigarettes.

Referring to Fig. 1, a filter rod may consist of seven filter sections, alternating with inner filter tip sections 1 at each end and tubing 2 which forms the mouthpiece of the filter between each pair of inner filter tip sections. The filtering sections 1 may be formed of any filtering material, such as the cellulose acetate filament type, crumpled paper, cotton wadding, crinkled paper, combinations of crinkled paper with carded web material, and other similar materials and arrangements designed to and capable of removing some of the objectionable constituents produced in the smoke caused by the burning of tobacco. The particular material used and the form of the inner filtering section forms no part of the present invention.

The rod shown in Fig. 1 is formed by arranging alternate sections 1 and 2 in a carrier or other support by any suitable means and then wrapping the sections in a paper wrapper 3 (see Fig. 2). The method and apparatus of my aforesaid prior application may be employed in the formation of the filter rods although this operation may be performed in other ways, if desired. Formation of filter rods of seven sections, as illustrated in Fig. 1, is purely arbitrary but is employed herein for the purpose of illustration because it is employed in the industry at the present time. Following the present practice, a half filter section is removed from each end by cutting the rod at lines 4 and the trimmed ends may be re-used in the manufacture of the additional filter sections 1, depending upon the characteristics of the material being used. The rod is then cut on the lines 5 to produce three rods each of two filter tips with inner filter tip sections 1 on the outer ends of each rod, and a double outer filter tip section 2 between them. These double filter tips are fed to a conventional cigarette-making machine and assembled between two tobacco sections 6 as illustrated in Fig. 3. The assembly is wrapped in cigarette paper 7 on the machine and then severed at line 8 in the middle of the double outer filter tip section 2 to form two filter tip cigarettes. As shown, each cigarette has a filter tip section 1 adjacent the tobacco 6 and an outer open tubing section 2 forming a mouthpiece or recessed filter tip.

In addition to stiff paper mentioned in my prior application, many other materials may be employed in the manufacture of the outer section of the filter tip. Any material having sufficient stiffness to resist extensive deformation during smoking of the cigarette and capable of being cut by the cutting apparatus used on high speed cigarette-making machines may be employed. I have prepared cigarettes having recessed filter tips in accordance with the disclosure of this application using a tube of cardboard. I may use any of a number of plastic materials capable of being extruded in tubular form, such as cellulose acetate or polyethylene. The tube may also be formed of a metal that is not too hard to be cut by the cutters of cigarette-making machines. Thus, a metal foil, such as aluminum, may be formed into a tube of several layers by winding it on a mandrel or other form, until the desired thickness is obtained. The metal may be extruded in tube form, or spirally wound from strip, or formed into a tube with a crimped seam.

A preferred method of forming the alternate sections 2 of the filter tip is to use heavy cellulose base material and in the form of spirally wound tubing, such as is used in the manufacture of sipping straws. The tubing is cut to form the double sections 2 shown in the drawings and then assembled with the sections 1 as heretofore described. In Fig. 2 I have illustrated the outer end of a filter tip showing the tube 9 which may be made of any of the materials and by any of the methods heretofore described and assembled in the wrapper 3 with the sections 1 to form the filter rod shown in Fig. 1. The thickness of the tube 9 is exaggerated for the purpose of illustration.

I claim:

As an article of manufacture a composite cigarette-filter rod assembly including at least two spaced columns of tobacco straddling a filter rod, said filter rod consisting only of two spaced, solid filter segments and an intermediate hollow tube abutting said solid segments, said segments and said tube having the same external diameter, said rod being sandwiched snugly between the tobacco columns, said segments and said tube each having unitary structure so as to be susceptible of individual handling, said segments and said tube being enclosed collectively in a single wrapper, said single wrapper being the only instrumentality operative to bind the segments and the tube into a package susceptible of handling as a unit, and an additional single wrapper enclosing the tobacco columns and the filter rod to bind the rod and the tobacco columns into said composite cigarette-filter rod assembly, said additional single wrapper being the only instrumentality operative to bind the rod and the columns of tobacco into a package susceptible of handling as a unit.

References Cited in the file of this patent

UNITED STATES PATENTS

| | | |
|---|---|---|
| 729,680 | Schwartz | June 2, 1903 |
| 987,359 | Gueniffet et al. | Mar. 21, 1911 |
| 2,171,770 | Strauch | Sept. 5, 1939 |
| 2,178,820 | Todoroff | Nov. 7, 1939 |
| 2,219,491 | Podmore | Oct. 29, 1940 |
| 2,755,206 | Statia | July 17, 1956 |
| 2,820,460 | Bunzl | Jan. 21, 1958 |

FOREIGN PATENTS

| | | |
|---|---|---|
| 66,121 | Switzerland | Oct. 23, 1913 |
| 377,147 | Great Britain | July 21, 1932 |
| 430,786 | Great Britain | June 21, 1935 |